US012608949B2

(12) United States Patent
Takaki et al.

(10) Patent No.: US 12,608,949 B2
(45) Date of Patent: Apr. 21, 2026

(54) INFORMATION PROCESSING DEVICE, NON-TRANSITORY STORAGE MEDIUM, AND INFORMATION PROCESSING METHOD

(71) Applicant: TOYOTA JIDOSHA KABUSHIKI KAISHA, Toyota (JP)

(72) Inventors: Hideyuki Takaki, Okazaki (JP); Yusuke Tsumita, Kashiwa (JP); Satoshi Kajiyama, Ibaraki (JP); Yasuhiro Kobatake, Nagoya (JP); Takafumi Yamadaira, Nagoya (JP); Kumiko Hayashi, Nagoya (JP); Tomoya Kajikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/968,155

(22) Filed: Dec. 4, 2024

(65) Prior Publication Data

US 2025/0239086 A1     Jul. 24, 2025

(30) Foreign Application Priority Data

Jan. 18, 2024    (JP) ................................. 2024-006335

(51) Int. Cl.
*G06V 20/56*      (2022.01)
(52) U.S. Cl.
CPC .................................... *G06V 20/56* (2022.01)
(58) Field of Classification Search
None
See application file for complete search history.

(56) References Cited

U.S. PATENT DOCUMENTS

| | | | |
|---|---|---|---|
| 2003/0120369 A1 | 6/2003 | Takaoka et al. | |
| 2018/0033007 A1* | 2/2018 | Chen .................... | G06Q 20/326 |
| 2024/0102307 A1* | 3/2024 | Cord ..................... | B65G 67/02 |
| 2025/0093875 A1* | 3/2025 | Radhakrishnan ...... | B60K 35/00 |

FOREIGN PATENT DOCUMENTS

JP        2002-297954 A     10/2002

* cited by examiner

*Primary Examiner* — Eileen M Adams
(74) *Attorney, Agent, or Firm* — Oliff PLC

(57) ABSTRACT

An information processing device includes a control unit configured to: acquire a travel video capturing a scene outside a vehicle before delivery when the vehicle is transported; acquire identification information on the vehicle; specify a user that has purchased the vehicle based on the identification information; and transmit the travel video to a terminal device of the user.

15 Claims, 5 Drawing Sheets

START

ACQUIRE TRAVEL VIDEO DURING TRANSPORT    S101

ACQUIRE IDENTIFICATION INFORMATION ON VEHICLE    S102

SPECIFY USER THAT HAS PURCHASED VEHICLE    S103

TRANSMIT TRAVEL VIDEO TO TERMINAL DEVICE OF USER    S104

END

INFORMATION PROCESSING DEVICE, NON-TRANSITORY STORAGE MEDIUM, AND INFORMATION PROCESSING METHOD

CROSS-REFERENCE TO RELATED APPLICATION

This application claims priority to Japanese Patent Application No. 2024-006335 filed on Jan. 18, 2024, incorporated herein by reference in its entirety.

BACKGROUND

1. Technical Field

The present disclosure relates to an information processing device, non-transitory storage medium, and an information processing method.

2. Description of Related Art

There has hitherto been known a system that provides a user that has purchased a vehicle with information on the progress of manufacture of the purchased vehicle.

Japanese Unexamined Patent Application Publication No. 2002-297954 (JP 2002-297954 A), for example, discloses a system that provides a user that has purchased a vehicle with information such as a captured image of the vehicle during assembly and position information on the vehicle during transport.

SUMMARY

When position information on the vehicle before delivery during transport is provided, the user that has purchased the vehicle can recognize the position of the vehicle before delivery. Even if the position of the vehicle before delivery is recognized, however, the expectation of the user that has purchased the vehicle about the delivery of the vehicle is not occasionally increased very much.

The present disclosure can increase the expectation of a user that has purchased a vehicle about the delivery of the vehicle.

A first aspect of the present disclosure provides an information processing device including a control unit configured to: acquire a travel video capturing a scene outside a vehicle before delivery when the vehicle is transported; acquire identification information on the vehicle; specify a user that has purchased the vehicle based on the identification information; and transmit the travel video to a terminal device of the user.

In the information processing device according to the above aspect, the control unit may be configured to transmit the travel video captured by an imaging device mounted on the vehicle to the terminal device when the vehicle is traveling autonomously to be transported.

In the information processing device according to the above aspect, the control unit may be configured to, when the vehicle is transported while traveling autonomously in tandem with one or more other vehicles, transmit a travel video of a highest quality, among the travel video captured by an imaging device mounted on the vehicle and the travel video captured by an imaging device mounted on each of the one or more other vehicles, to the terminal device.

In the information processing device according to the above aspect, the travel video of the highest quality may be the travel video captured by an imaging device mounted on a vehicle traveling at a leading end, among the vehicle and the one or more other vehicles.

In the information processing device according to the above aspect, the control unit may be configured to, when the vehicle is transported as being mounted on a carrier car, transmit the travel video captured by an imaging device mounted on the carrier car to the terminal device.

In the information processing device according to the above aspect, the control unit may be configured to transmit the travel video to the terminal device when a delivery schedule of the vehicle is delayed or when a request to transmit the travel video is acquired from the terminal device.

In the information processing device according to the above aspect, the control unit may be configured to transmit the travel video captured when the vehicle passes an area designated in advance to the terminal device.

A non-transitory storage medium storing instructions that are executable by one or more processors and that cause the one or more processors to perform functions comprising: acquiring a travel video capturing a scene outside a vehicle before delivery when the vehicle is transported; acquiring identification information on the vehicle; specifying a user that has purchased the vehicle based on the identification information; and transmitting the travel video to a terminal device of the user.

In the program according to the above aspect, when the vehicle is traveling autonomously to be transported, the transmitting of the travel video may include transmitting the travel video captured by an imaging device mounted on the vehicle to the terminal device.

In the program according to the above aspect, when the vehicle is transported while traveling autonomously in tandem with one or more other vehicles, the transmitting of the travel video may include transmitting a travel video of a highest quality, among the travel video captured by an imaging device mounted on the vehicle and the travel video captured by an imaging device mounted on each of the one or more other vehicles, to the terminal device.

In the program according to the above aspect, the travel video of the highest quality may be the travel video captured by an imaging device mounted on a vehicle traveling at a leading end, among the vehicle and the one or more other vehicles.

In the program according to the above aspect, when the vehicle is transported as being mounted on a carrier car, the transmitting of the travel video may include transmitting the travel video captured by an imaging device mounted on the carrier car to the terminal device.

In the program according to the above aspect, the transmitting of the travel video may include transmitting the travel video to the terminal device when a delivery schedule of the vehicle is delayed or when a request to transmit the travel video is acquired from the terminal device.

In the program according to the above aspect, the transmitting of the travel video may include transmitting the travel video captured when the vehicle passes an area designated in advance to the terminal device.

A third aspect of the present disclosure provides an information processing method performed by an information processing device, the information processing method including: acquiring a travel video capturing a scene outside a vehicle before delivery when the vehicle is transported; acquiring identification information on the vehicle; specifying a user that has purchased the vehicle based on the identification information; and transmitting the travel video to a terminal device of the user.

In the information processing method according to the above aspect, when the vehicle is traveling autonomously to be transported, the transmitting of the travel video may include transmitting the travel video captured by an imaging device mounted on the vehicle to the terminal device.

In the information processing method according to the above aspect, when the vehicle is transported while traveling autonomously in tandem with one or more other vehicles, the transmitting of the travel video may include transmitting a travel video of a highest quality, among the travel video captured by an imaging device mounted on the vehicle and the travel video captured by an imaging device mounted on each of the one or more other vehicles, to the terminal device.

In the information processing method according to the above aspect, the travel video of the highest quality may be the travel video captured by an imaging device mounted on a vehicle traveling at a leading end, among the vehicle and the one or more other vehicles.

In the information processing method according to the above aspect, when the vehicle is transported as being mounted on a carrier car, the transmitting of the travel video may include transmitting the travel video captured by an imaging device mounted on the carrier car to the terminal device.

In the information processing method according to the above aspect, the transmitting of the travel video may include transmitting the travel video to the terminal device when a delivery schedule of the vehicle is delayed or when a request to transmit the travel video is acquired from the terminal device.

According to the present disclosure, it is possible to increase the expectation of a user that has purchased a vehicle about the delivery of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings.

Figure 1:
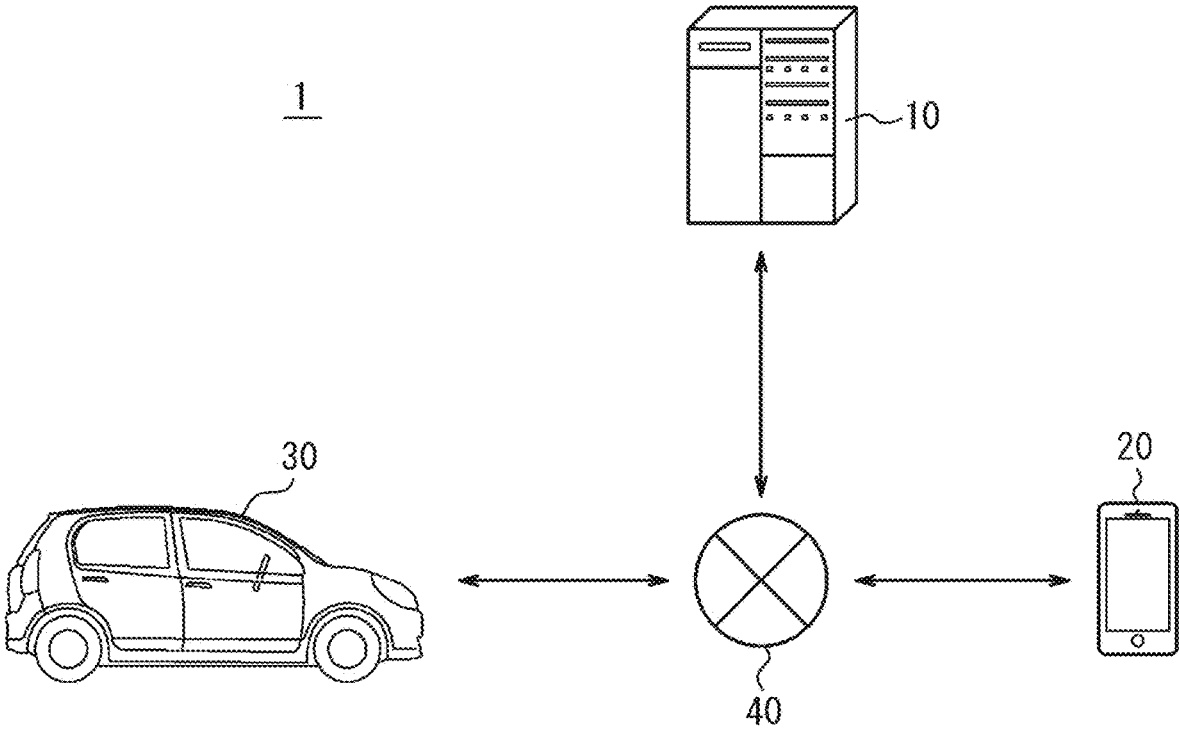
FIG. 1 illustrates the configuration of an information processing system according to an embodiment of the present disclosure.

FIG. 1 illustrates the configuration of an information processing system 1 according to an embodiment of the present disclosure. The configuration and an overview of the information processing system 1 according to the embodiment of the present disclosure will be described with reference to FIG. 1.

The information processing system 1 includes an information processing device 10, a terminal device 20, and a vehicle 30. The information processing device 10, the terminal device 20, and the vehicle 30 are communicably connected to each other via a network 40. The network 40 may be a network including a mobile communication network, the Internet, etc.

While one information processing device 10 is illustrated in FIG. 1, there may be two or more information processing devices 10. While one terminal device 20 is illustrated in FIG. 1, there may be two or more terminal devices 20. While one vehicle 30 is illustrated in FIG. 1, there may be two or more vehicles 30.

The information processing device 10 is a dedicated computer configured to function as a server, for example. The information processing device 10 may be a general-purpose personal computer (PC). The information processing device 10 can communicate with the terminal device 20 and the vehicles 30 via the network 40.

When the vehicle 30 before delivery is transported, the information processing device 10 acquires a travel video capturing a scene outside the vehicle 30 during transport. The information processing device 10 transmits the acquired travel video to the terminal device 20 of a user that has purchased the vehicle 30.

The information processing device 10 may be installed at a dealer, or may be installed at other facilities. Here, the "dealer" refers to a sales office of the vehicle 30.

The terminal device 20 is a terminal device owned by the user that has purchased the vehicle 30.

The terminal device 20 may be a smartphone, a tablet, a personal computer, etc., for example. The terminal device 20 can communicate with the information processing device 10 via the network 40.

The vehicle 30 is a vehicle purchased by the user. In the present embodiment, the vehicle 30 is a vehicle before delivery. The vehicle 30 is transported to a dealer after being manufactured, and is delivered to the user when ready.

The vehicle 30 may travel autonomously to be transported to the dealer, or may be mounted on a carrier car to be transported to the dealer.

Figure 2:
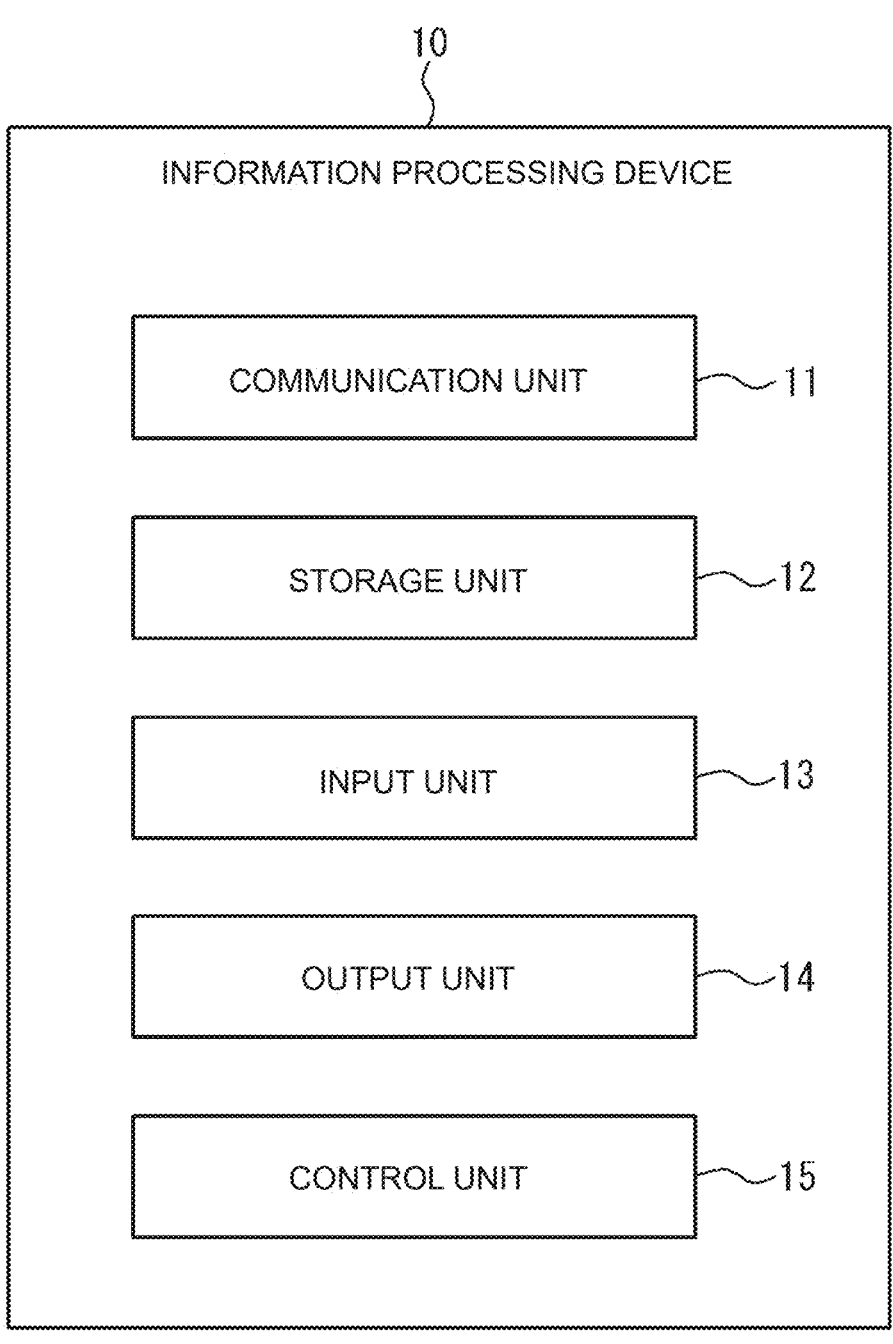
FIG. 2 is a block diagram illustrating the configuration of an information processing device according to the embodiment of the present disclosure.

The configuration of the information processing device 10 according to the embodiment of the present disclosure will be described with reference to FIG. 2.

The information processing device 10 includes a communication unit 11, a storage unit 12, an input unit 13, an output unit 14, and a control unit 15.

The communication unit 11 includes a communication module connected to the network 40. For example, the communication unit 11 may include a communication module that supports a local area network (LAN). In one embodiment, the information processing device 10 is connected to the network 40 via the communication unit 11. The communication unit 11 transmits and receives various types of information via the network 40. The communication unit 11 can communicate with the terminal device 20 and the vehicle 30 via the network 40.

Examples of the storage unit 12 include, but are not limited to, a semiconductor memory, a magnetic memory, an optical memory, etc. The storage unit 12 may function as a main storage device, an auxiliary storage device, or a cache memory, for example. The storage unit 12 stores any information that is used for operation of the information processing device 10. For example, the storage unit 12 may store a system program, an application program, various types of information received by the communication unit 11, etc. The information stored in the storage unit 12 may be updated using information received from the network 40 via the communication unit 11, for example. A part of the storage unit 12 may be installed outside the information processing device 10. In that case, the part of the storage unit 12 installed outside may be connected to the information processing device 10 via a desired interface.

The input unit 13 includes one or more input interfaces for acquiring input information based on an operation by the user by detecting a user input. Examples of the input unit 13 include, but are not limited to, a physical key, a capacitance key, a touch screen provided integrally with a display of the output unit 14, a microphone that receives an audio input, etc.

The output unit 14 includes one or more output interfaces that notify the user by outputting information. Examples of the output unit 14 include, but are not limited to, a display that outputs information as an image, a speaker that outputs information as audio, etc.

The control unit 15 includes at least one processor, at least one dedicated circuit, or a combination of these. The processor may be a general-purpose processor such as a central processing unit (CPU) or a graphics processing unit (GPU), or a dedicated processor specifically for a specific process. The dedicated circuit may be a field-programmable gate array (FPGA) or an application-specific integrated circuit (ASIC), for example. The control unit 15 executes a process related to operation of the information processing device 10 while controlling the various units of the information processing device 10.

Figure 3:
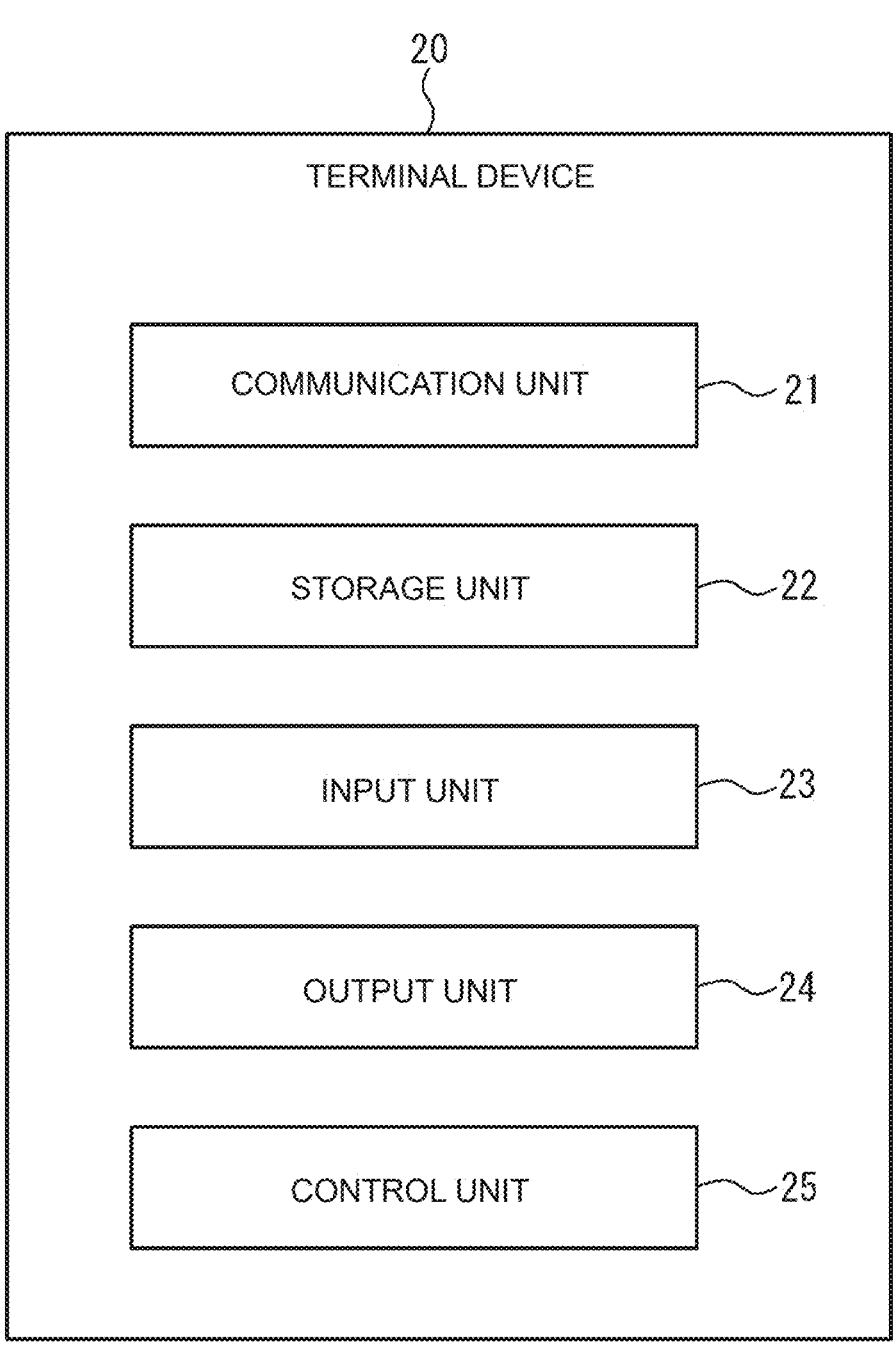
FIG. 3 is a block diagram illustrating the configuration of a terminal device according to the embodiment of the present disclosure.

The configuration of the terminal device 20 according to the embodiment of the present disclosure will be described with reference to FIG. 3.

The terminal device 20 includes a communication unit 21, a storage unit 22, an input unit 23, an output unit 24, and a control unit 25.

The communication unit 21 includes a communication module connected to the network 40. For example, the communication unit 21 may include a communication module that supports a mobile communication standard such as Long-Term Evolution (LTE), 4th generation (4G), and 5th generation (5G). In one embodiment, the terminal device 20 is connected to the network 40 via the communication unit 21. The communication unit 21 transmits and receives various types of information via the network 40. The communication unit 21 can communicate with the information processing device 10 via the network 40.

Examples of the storage unit 22 include, but are not limited to, a semiconductor memory, a magnetic memory, an optical memory, etc. The storage unit 22 may function as a main storage device, an auxiliary storage device, or a cache memory, for example. The storage unit 22 stores any information that is used for operation of the terminal device 20. For example, the storage unit 22 may store a system program, an application program, various types of information received by the communication unit 21, etc. The information stored in the storage unit 22 may be updated using information received from the network 40 via the communication unit 21, for example. A part of the storage unit 22 may be installed outside the terminal device 20. In that case, the part of the storage unit 22 installed outside may be connected to the terminal device 20 via a desired interface.

The input unit 23 includes one or more input interfaces for acquiring input information based on an operation by the user by detecting a user input. Examples of the input unit 23 include, but are not limited to, a physical key, a capacitance key, a touch screen provided integrally with a display of the output unit 24, a microphone that receives an audio input, etc.

The output unit 24 includes one or more output interfaces that notify the user by outputting information. Examples of the output unit 24 include, but are not limited to, a display that outputs information as an image, a speaker that outputs information as audio, etc.

The control unit 25 includes at least one processor, at least one dedicated circuit, or a combination of these. The processor may be a general-purpose processor such as a CPU or a GPU, or a dedicated processor specifically for a specific process. The dedicated circuit may be an FPGA or an ASIC, for example. The control unit 25 executes a process related to operation of the terminal device 20 while controlling the various units of the terminal device 20.

Operation of Information Processing System

Operation of the information processing system 1 illustrated in FIG. 1 will be described with reference to FIGS. 2, 3, etc.

When the vehicle 30 before delivery purchased by the user is transported, the control unit 15 of the information processing device 10 acquires a travel video capturing a scene outside the vehicle 30 before delivery when the vehicle 30 is transported.

When the vehicle 30 is traveling autonomously to be transported, the scene outside the vehicle 30 before delivery being transported may be a travel video captured by an imaging device mounted on the vehicle 30. The imaging device mounted on the vehicle 30 may be a drive recorder, for example.

The travel video may be a movie, or may be a time-lapse video prepared using a plurality of still images captured sequentially.

When a travel video is captured while the vehicle 30 is transported, the vehicle 30 transmits the captured travel video to the information processing device 10. The vehicle 30 may transmit identification information for identifying the vehicle 30, position information on the vehicle 30, and vehicle information on the vehicle 30 together with the travel video. The vehicle information on the vehicle 30 may include information such as the travel speed of the vehicle 30, for example.

The control unit 15 of the information processing device 10 acquires the travel video transmitted by the vehicle 30 being transported via the communication unit 11. The control unit 15 may also acquire the identification information on the vehicle 30, the position information on the vehicle 30, and the vehicle information on the vehicle 30, transmitted by the vehicle 30 being transported, via the communication unit 11.

The control unit 15 may determine whether the vehicle 30 is traveling autonomously to be transported, based on the vehicle information on the vehicle 30. For example, the control unit 15 may determine that the vehicle 30 is traveling autonomously to be transported when the travel speed of the vehicle 30 included in the vehicle information on the vehicle 30 is equal to or more than a predetermined speed.

When the identification information on the vehicle 30 is acquired from the vehicle 30 being transported, the control unit 15 specifies the user that has purchased the vehicle 30 and the terminal device 20 owned by the user. Data in which the identification information on the vehicle 30, information on the user that has purchased the vehicle 30, and the terminal device 20 owned by the user are associated with each other may be stored in the storage unit 12. When the identification information on the vehicle 30 is acquired, the control unit 15 specifies the user that has purchased the vehicle 30 and the terminal device 20 owned by the user with reference to the data stored in the storage unit 12.

When the user that has purchased the vehicle 30 being transported is specified, the control unit 15 transmits the travel video acquired from the vehicle 30 to the terminal device 20 of the user via the communication unit 11. When the vehicle 30 is traveling autonomously to be transported, the travel video transmitted to the terminal device 20 by the control unit 15 is a travel video captured by the imaging device mounted on the vehicle 30.

The control unit 25 of the terminal device 20 acquires the travel video transmitted by the control unit 15 of the information processing device 10 via the communication unit 21.

The control unit 25 causes the output unit 24 to display the acquired travel video. This allows the user that has purchased the vehicle 30 to view the travel video capturing a scene outside the vehicle 30 before delivery when the vehicle 30 is transported. Consequently, the information processing device 10 can increase the expectation of the user, waiting for the delivery of the vehicle 30 that has been purchased, about the delivery of the vehicle 30.

The control unit 15 of the information processing device 10 may transmit a travel video to the terminal device 20 when the delivery schedule of the vehicle 30 is delayed. This allows the user that has purchased the vehicle 30 to wait with the expectation about the delivery increased by watching the travel video of a scene outside the vehicle 30 before delivery when the vehicle 30 is transported, while the delivery schedule of the vehicle 30 is delayed.

Alternatively, the control unit 15 may transmit a travel video to the terminal device 20 when a request to transmit a travel video is acquired from the terminal device 20. This makes it possible to transmit a travel video of a scene outside the vehicle 30 before delivery being transported to the terminal device 20 at the timing when the user that has purchased the vehicle 30 desires to see a travel video.

Alternatively, the control unit 15 may regularly transmit a travel video to the terminal device 20. The control unit 15 may regularly transmit a travel video to the terminal device 20 at a frequency of once an hour, for example. This allows the user that has purchased the vehicle 30 to regularly view a travel video of a scene outside the vehicle 30 before delivery being transported.

The user that has purchases the vehicle 30 may designate in advance an area through which the user desires the vehicle 30 before delivery to pass. For example, the user may designate such a desirable area by operating the input unit 23 of the terminal device 20.

When the input unit 23 receives an input of the desirable area, the control unit 25 transmits information on the desirable area to the information processing device 10 via the communication unit 21.

The control unit 15 of the information processing device 10 acquires the information on the desirable area transmitted by the terminal device 20 via the communication unit 11. The control unit 15 stores the information on the desirable area in the storage unit 12.

When it is determined that the travel video acquired from the vehicle 30 is a travel video captured when passing through the area designated in advance by the user, the control unit 15 transmits the travel video captured when passing through the designated area to the terminal device 20 via the communication unit 11. The control unit 15 may determine whether the travel video acquired from the vehicle 30 is a travel video captured when passing through the area designated in advance by the user based on the position information on the vehicle 30 acquired from the vehicle 30.

This allows the user that has purchased the vehicle 30 to view the travel video captured when the vehicle being transported passes through the area designated in advance.

Travel in Tandem

Figure 4:
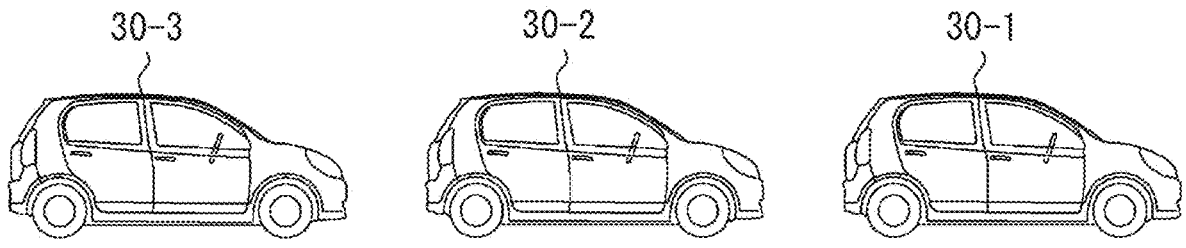
FIG. 4 illustrates how a vehicle purchased by a user is transported while traveling autonomously in tandem with other vehicles.

FIG. 4 illustrates how the vehicle 30 purchased by the user is transported while traveling autonomously in tandem with other vehicles 30. While FIG. 4 illustrates three vehicles 30-1 to 30-3 traveling in tandem with each other, this is exemplary. Any number of vehicles 30, the number being two or more, may travel in tandem with each other.

Hereinafter, it is assumed that the vehicle 30 purchased by the user is the vehicle 30-3 traveling at the tail end. It is also assumed that the vehicle 30-1 traveling at the leading end and the vehicle 30-2 traveling in the second place are the other vehicles 30 being transported while traveling in tandem with the vehicle 30 purchased by the user.

The vehicles 30-1 to 30-3 each capture a travel video while being transported. The vehicles 30-1 to 30-3 each transmit the captured travel video to the information processing device 10. The vehicles 30-1 to 30-3 may each capture a travel video using an imaging device mounted on the vehicles 30-1 to 30-3. The imaging device mounted on the vehicles 30-1 to 30-3 may be a drive recorder, for example. The vehicles 30-1 to 30-3 also transmit identification information for identifying the vehicles 30-1 to 30-3, position information on the vehicles 30-1 to 30-3, and vehicle information on the vehicles 30-1 to 30-3 together with the travel video.

The control unit 15 of the information processing device 10 acquires the travel video transmitted by each of the vehicles 30-1 to 30-3 via the communication unit 11. The control unit 15 also acquires the identification information on the vehicles 30-1 to 30-3, the position information on the vehicles 30-1 to 30-3, and the vehicle information on the vehicles 30-1 to 30-3, transmitted by each of the vehicles 30-1 to 30-3, via the communication unit 11.

When it is determined based on the position information on the vehicles 30-1 to 30-3 that the vehicles 30-1 to 30-3 are traveling in close proximity to each other, the control unit 15 may determine that the vehicle 30-3 purchased by the user is transported while traveling in tandem with the other vehicles 30-1 and 30-2.

When the vehicle 30-3 purchased by the user is transported while traveling autonomously in tandem with the other vehicles 30-1 and 30-2, the control unit 15 may transmit a travel video of the highest quality, among the travel video captured by the imaging device mounted on the vehicle 30-3 purchased by the user and the travel video captured by the imaging device mounted on each of the other vehicles 30-1 and 30-2, to the terminal device 20 via the communication unit 11.

The control unit 15 may transmit the travel video captured by the imaging device mounted on the vehicle 30-1 traveling at the leading end, among the travel video captured by the imaging device mounted on the vehicle 30-3 purchased by the user and the travel videos captured by the imaging devices mounted on the other vehicles 30-1 and 30-2, as the travel video of the highest quality to the terminal device 20, for example.

The control unit 15 may determine that the vehicle 30-1 is traveling at the leading end, based on the position information on the vehicles 30-1 to 30-3.

In this manner, by the control unit 15 transmitting the travel video of the highest quality to the terminal device 20, the user that has purchased the vehicle 30 can view the travel video of the highest quality when the vehicle 30-3 before delivery is transported while traveling in tandem with the other vehicles 30-1 and 30-2.

Travel while being Mounted on Carrier Car

Figure 5:
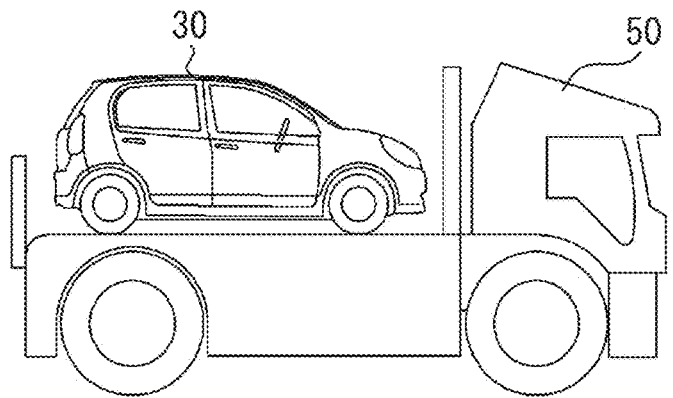
FIG. 5 illustrates how a vehicle purchased by a user is transported while being mounted on a carrier car.

FIG. 5 illustrates how the vehicle 30 purchased by the user is transported while being mounted on a carrier car 50.

The vehicle 30 and the carrier car 50 each capture a travel video when the vehicle 30 is transported. The vehicle 30 and the carrier car 50 each transmit the captured travel video to the information processing device 10. The carrier car 50 may capture a travel video using an imaging device mounted on the carrier car 50. The imaging device mounted on the carrier car 50 may be a drive recorder, for example. The vehicle 30 also transmits identification information for identifying the vehicle 30, position information on the vehicle 30, and vehicle information on the vehicle 30 together with the travel video. The carrier car 50 also transmits identification information for identifying the carrier car 50, position information on the carrier car 50, and vehicle information on the carrier car 50 together with the travel video.

The control unit 15 of the information processing device 10 acquires the travel videos transmitted by the vehicle 30 and the carrier car 50 via the communication unit 11. The control unit 15 also acquires the identification information on the vehicle 30, the position information on the vehicle 30, and the vehicle information on the vehicle 30 transmitted by the vehicle 30 via the communication unit 11. The control unit 15 also acquires the identification information on the carrier car 50, the position information on the carrier car 50, and the vehicle information on the carrier car 50 transmitted by the carrier car 50 via the communication unit 11.

The control unit 15 may determine that the vehicle 30 is transported as being mounted on the carrier car 50 based on the position information on the vehicle 30 and the carrier car 50 and the vehicle information on the vehicle 30. The control unit 15 may determine that the vehicle 30 is transported as being mounted on the carrier car 50 when the vehicle 30 and the carrier car 50 are at the same position and the travel speed of the vehicle 30 is zero, for example.

When the vehicle 30 purchased by the user is transported as being mounted on the carrier car 50, the control unit 15 transmits the travel video captured by the imaging device mounted on the carrier car 50 to the terminal device 20 via the communication unit 11.

In this manner, by the control unit 15 transmitting the travel video captured by the imaging device mounted on the carrier car 50 to the terminal device 20, the user that has purchased the vehicle 30 can view the travel video captured by the imaging device mounted on the carrier car 50, providing a better view than the travel video captured by the imaging device mounted on the vehicle 30, when the vehicle 30 before delivery is transported as being mounted on the carrier car 50.

Figure 6:
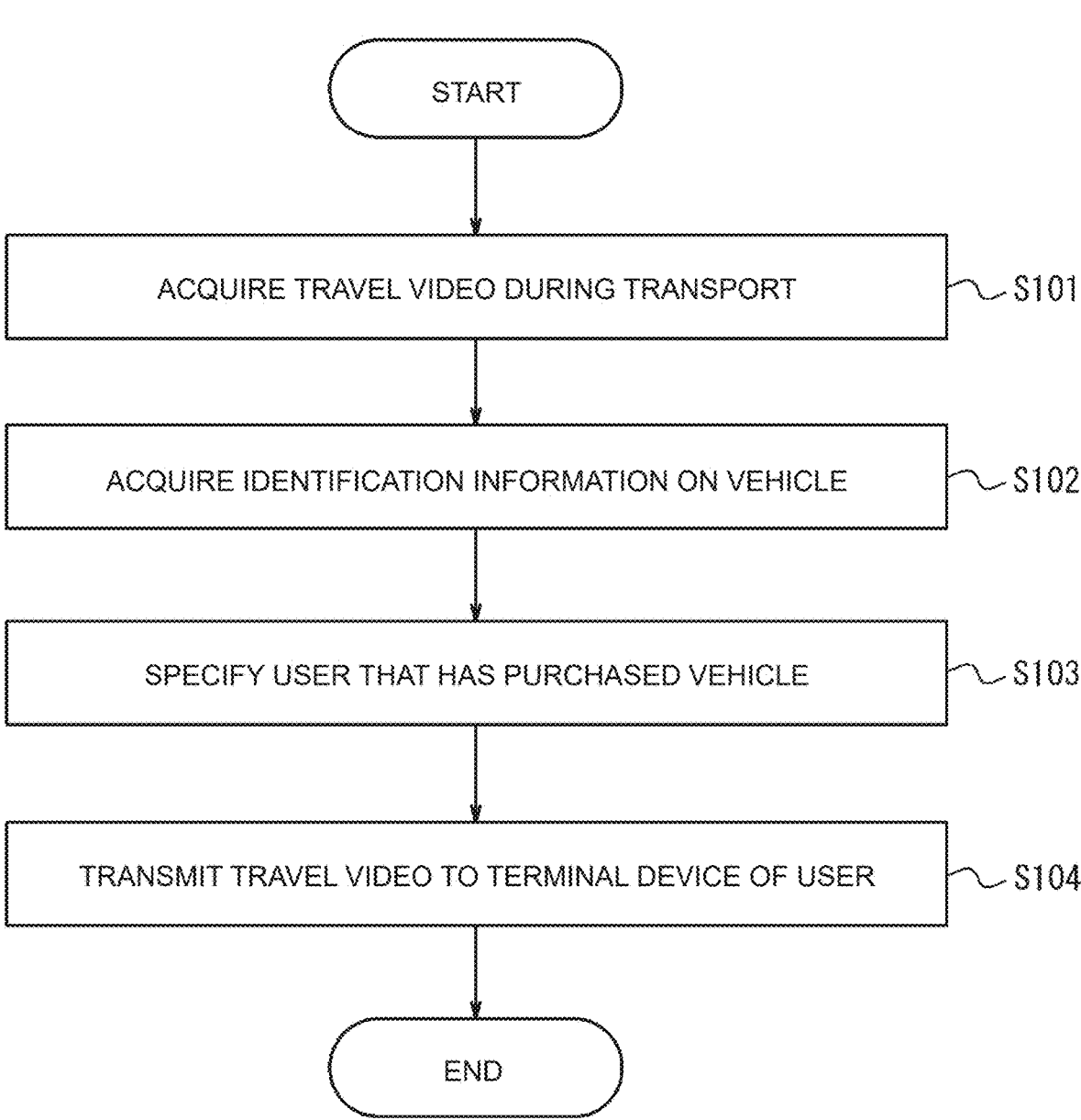
FIG. 6 is a flowchart illustrating operation of the information processing system according to the embodiment of the present disclosure.

Operation of the information processing device 10 will be described with reference to the flowchart illustrated in FIG. 6.

Step S101: The control unit 15 of the information processing device 10 acquires a travel video capturing a scene outside the vehicle 30 before delivery when the vehicle 30 is transported.

Step S102: The control unit 15 acquires identification information on the vehicle 30 being transported from the vehicle 30.

Step S103: When identification information on the vehicle 30 being transported is acquired from the vehicle 30, the control unit 15 specifies a user that has purchased the vehicle 30 and the terminal device 20 owned by the user.

Step S104: When a user that has purchased the vehicle 30 being transported is specified, the control unit 15 transmits a travel video capturing a scene outside the vehicle 30 before delivery when the vehicle 30 is transported to the terminal device 20 of the user.

In the information processing device 10 according to the present embodiment, as discussed above, the control unit 15 acquires a travel video capturing a scene outside the vehicle 30 before delivery when the vehicle 30 is transported, and transmits the acquired travel video to the terminal device 20 of a user that has purchased the vehicle 30. This allows the user that has purchased the vehicle 30 to view a scene outside the vehicle 30 before delivery being transported. Thus, the information processing device 10 according to the present embodiment can increase the expectation of a user that has purchased a vehicle about the delivery of the vehicle while the user is waiting for the delivery of the vehicle.

The present disclosure is not limited to the embodiment discussed above. For example, a plurality of blocks illustrated in the block diagram may be integrated with each other, or a single block may be divided. A plurality of steps indicated in the flowchart may be executed in parallel, or in a different order, in accordance with the processing capability of the device that executes the steps, or as necessary, rather than being executed chronologically in accordance with the description. Other modifications can be made without departing from the spirit and scope of the present disclosure.

For example, a part of the processing operation executed by the information processing device 10 in the embodiment discussed above may be executed by the terminal device 20. Meanwhile, a part of the processing operation executed by the terminal device 20 in the embodiment discussed above may be executed by the information processing device 10.

A general-purpose electronic device such as a smartphone or a computer may be configured to function as the information processing device 10 according to the embodiment discussed above, for example. Specifically, it is conceivable that a program that describes the content of processes that implement the functions of the information processing device 10, etc., according to the embodiment is stored in a memory of the electronic device, and that the program is read and executed by a processor of the electronic device. Thus, the disclosure according to one embodiment can be implemented also as a program that can be executed by a processor.

A part of the embodiment of the present disclosure will be given as an example below. However, the embodiment of the present disclosure is not limited thereto.

Appendix 1

An information processing device including a control unit configured to: acquire a travel video capturing a scene outside a vehicle before delivery when the vehicle is transported; acquire identification information on the vehicle; specify a user that has purchased the vehicle based on the identification information; and transmit the travel video to a terminal device of the user.

Appendix 2

The information processing device according to appendix 1, in which the control unit is configured to transmit the travel video captured by an imaging device mounted on the vehicle to the terminal device when the vehicle is traveling autonomously to be transported.

Appendix 3

The information processing device according to appendix 1 or 2, in which the control unit is configured to, when the vehicle is transported while traveling autonomously in tandem with one or more other vehicles, transmit a travel video of a highest quality, among the travel video captured by an imaging device mounted on the vehicle and the travel video captured by an imaging device mounted on each of the one or more other vehicles, to the terminal device.

Appendix 4

The information processing device according to any one of appendices 1 to 3, in which the travel video of the highest quality is the travel video captured by an imaging device mounted on a vehicle traveling at a leading end, among the vehicle and the one or more other vehicles.

Appendix 5

The information processing device according to any one of appendices 1 to 4, in which the control unit is configured to, when the vehicle is transported as being mounted on a carrier car, transmit the travel video captured by an imaging device mounted on the carrier car to the terminal device.

Appendix 6

The information processing device according to any one of appendices 1 to 5, in which the control unit is configured to transmit the travel video to the terminal device when a delivery schedule of the vehicle is delayed or when a request to transmit the travel video is acquired from the terminal device.

Appendix 7

The information processing device according to any one of appendices 1 to 6, in which the control unit is configured to transmit the travel video captured when the vehicle passes an area designated in advance to the terminal device.

Appendix 8

A program that causes a computer to execute operation including: acquiring a travel video capturing a scene outside a vehicle before delivery when the vehicle is transported; acquiring identification information on the vehicle; specifying a user that has purchased the vehicle based on the identification information; and transmitting the travel video to a terminal device of the user.

Appendix 9

The program according to appendix 8, in which when the vehicle is traveling autonomously to be transported, the transmitting of the travel video includes transmitting the travel video captured by an imaging device mounted on the vehicle to the terminal device.

Appendix 10

The program according to appendix 8 or 9, in which when the vehicle is transported while traveling autonomously in tandem with one or more other vehicles, the transmitting of the travel video includes transmitting a travel video of a highest quality, among the travel video captured by an imaging device mounted on the vehicle and the travel video captured by an imaging device mounted on each of the one or more other vehicles, to the terminal device.

Appendix 11

The program according to any one of appendices 8 to 10, in which the travel video of the highest quality is the travel video captured by an imaging device mounted on a vehicle traveling at a leading end, among the vehicle and the one or more other vehicles.

Appendix 12

The program according to any one of appendices 8 to 11, in which when the vehicle is transported as being mounted on a carrier car, the transmitting of the travel video includes transmitting the travel video captured by an imaging device mounted on the carrier car to the terminal device.

Appendix 13

The program according to any one of appendices 8 to 12, in which the transmitting of the travel video includes transmitting the travel video to the terminal device when a delivery schedule of the vehicle is delayed or when a request to transmit the travel video is acquired from the terminal device.

Appendix 14

The program according to any one of appendices 8 to 13, in which the transmitting of the travel video includes transmitting the travel video captured when the vehicle passes an area designated in advance to the terminal device.

Appendix 15

An information processing method performed by an information processing device, the information processing method including: acquiring a travel video capturing a scene outside a vehicle before delivery when the vehicle is transported; acquiring identification information on the vehicle; specifying a user that has purchased the vehicle based on the identification information; and transmitting the travel video to a terminal device of the user.

Appendix 16

The information processing method according to appendix 15, in which when the vehicle is traveling autonomously to be transported, the transmitting of the travel video includes transmitting the travel video captured by an imaging device mounted on the vehicle to the terminal device.

Appendix 17

The information processing method according to appendix 15 or 16, in which when the vehicle is transported while traveling autonomously in tandem with one or more other vehicles, the transmitting of the travel video includes transmitting a travel video of a highest quality, among the travel video captured by an imaging device mounted on the vehicle and the travel video captured by an imaging device mounted on each of the one or more other vehicles, to the terminal device.

Appendix 18

The information processing method according to any one of appendices 15 to 17, in which the travel video of the highest quality is the travel video captured by an imaging device mounted on a vehicle traveling at a leading end, among the vehicle and the one or more other vehicles.

Appendix 19

The information processing method according to any one of appendices 15 to 18, in which when the vehicle is transported as being mounted on a carrier car, the transmitting of the travel video includes transmitting the travel video captured by an imaging device mounted on the carrier car to the terminal device.

Appendix 20

The information processing method according to any one of appendices 15 to 19, in which the transmitting of the travel video includes transmitting the travel video to the terminal device when a delivery schedule of the vehicle is delayed or when a request to transmit the travel video is acquired from the terminal device.

What is claimed is:

1. An information processing device comprising a control unit configured to:

acquire a travel video capturing a scene outside a vehicle before delivery when the vehicle is transported;

acquire identification information on the vehicle;

specify a user that has purchased the vehicle based on the identification information; and transmit the travel video to a terminal device of the user, wherein the control unit is configured to, when the vehicle is transported while traveling autonomously in tandem with one or more other vehicles, transmit a travel video of a highest quality, among the travel video captured by an imaging device mounted on the vehicle and the travel video captured by an imaging device mounted on each of the one or more other vehicles, to the terminal device.

2. The information processing device according to claim 1, wherein the travel video of the highest quality is the travel video captured by an imaging device mounted on a vehicle traveling at a leading end, among the vehicle and the one or more other vehicles traveling autonomously in tandem.

3. The information processing device according to claim 1, wherein the control unit is configured to, when the vehicle is transported as being mounted on a carrier car, transmit the travel video captured by an imaging device mounted on the carrier car to the terminal device.

4. The information processing device according to claim 1, wherein the control unit is configured to transmit the travel video to the terminal device when a delivery schedule of the vehicle is delayed or when a request to transmit the travel video is acquired from the terminal device.

5. The information processing device according to claim 1, wherein the control unit is configured to transmit the travel video captured when the vehicle passes an area designated in advance to the terminal device.

6. A non-transitory storage medium storing instructions that are executable by one or more processors and that cause the one or more processors to perform functions comprising:

acquiring a travel video capturing a scene outside a vehicle before delivery when the vehicle is transported;

acquiring identification information on the vehicle;

specifying a user that has purchased the vehicle based on the identification information; and transmitting the travel video to a terminal device of the user, wherein when the vehicle is transported while traveling autonomously in tandem with one or more other vehicles, the transmitting of the travel video includes transmitting a travel video of a highest quality, among the travel video captured by an imaging device mounted on the vehicle and the travel video captured by an imaging device mounted on each of the one or more other vehicles, to the terminal device.

7. The non-transitory storage medium according to claim 6, wherein the travel video of the highest quality is the travel video captured by an imaging device mounted on a vehicle traveling at a leading end, among the vehicle and the one or more other vehicles traveling autonomously in tandem.

8. The non-transitory storage medium according to claim 6, wherein when the vehicle is transported as being mounted on a carrier car, the transmitting of the travel video includes transmitting the travel video captured by an imaging device mounted on the carrier car to the terminal device.

9. The non-transitory storage medium according to claim 6, wherein the transmitting of the travel video includes transmitting the travel video to the terminal device when a delivery schedule of the vehicle is delayed or when a request to transmit the travel video is acquired from the terminal device.

10. The non-transitory storage medium according to claim 6, wherein the transmitting of the travel video includes transmitting the travel video captured when the vehicle passes an area designated in advance to the terminal device.

11. An information processing method performed by an information processing device, the information processing method comprising:

acquiring a travel video capturing a scene outside a vehicle before delivery when the vehicle is transported;

acquiring identification information on the vehicle;

specifying a user that has purchased the vehicle based on the identification information; and transmitting the travel video to a terminal device of the user, wherein when the vehicle is transported while traveling autonomously in tandem with one or more other vehicles, the transmitting of the travel video includes transmitting a travel video of a highest quality, among the travel video captured by an imaging device mounted on the vehicle and the travel video captured by an imaging device mounted on each of the one or more other vehicles, to the terminal device.

12. The information processing method according to claim 11, wherein the travel video of the highest quality is the travel video captured by an imaging device mounted on a vehicle traveling at a leading end, among the vehicle and the one or more other vehicles traveling autonomously in tandem.

13. The information processing method according to claim 11, wherein when the vehicle is transported as being mounted on a carrier car, the transmitting of the travel video includes transmitting the travel video captured by an imaging device mounted on the carrier car to the terminal device.

14. The information processing method according to claim 11, wherein the transmitting of the travel video includes transmitting the travel video to the terminal device when a delivery schedule of the vehicle is delayed or when a request to transmit the travel video is acquired from the terminal device.

15. The information processing method according to claim 11, wherein the transmitting of the travel video includes transmitting the travel video captured when the vehicle passes an area designated in advance to the terminal device.

* * * * *